United States Patent [19]

Murphy et al.

[11] 3,953,386

[45] Apr. 27, 1976

[54] AQUEOUS EMULSIONS CONTAINING HOMOGENEOUS PARTICLES OF CELLULOSIC ESTER/ACRYLIC POLYMERS

[75] Inventors: Charles Vincent Murphy; David William Zunker, both of Wilmington, Del.

[73] Assignee: E. I. Du Pont de Nemours and Company, Wilmington, Del.

[22] Filed: July 2, 1974

[21] Appl. No.: 485,271

[52] U.S. Cl. .............................. 260/17 A; 526/319; 526/320; 526/200
[51] Int. Cl.² ....................... C08L 1/18; C08L 1/10
[58] Field of Search ..... 260/17 A, 89.5 A, 89.5 AW

[56] References Cited
UNITED STATES PATENTS

| | | | |
|---|---|---|---|
| 2,171,765 | 12/1934 | Röhm et al. | 260/17 R |
| 2,839,479 | 6/1958 | Caldwell | 260/17 |
| 3,061,598 | 10/1962 | Cornell | 260/17 |
| 3,716,505 | 2/1973 | Ohe et al. | 260/17 A |

*Primary Examiner*—Donald E. Czaja
*Assistant Examiner*—Edward Woodberry

[57] ABSTRACT

Process for the preparation of aqueous homogeneous polymer emulsion which comprises mixing, generally with agitation or under shear conditions, water, surfactant, at least one polymer, e.g., cellulosic compounds, and at least one monomer, e.g., acrylics, methacrylics, styrene, etc., the polymer being soluble in said monomer, to form a dispersion of polymer-monomer particles in water; then subjecting said dispersion to conditions such that the monomer within the particles becomes polymerized by free radical polymerization forming a substantially homogeneous blend of at least two polymers within the particles of the emulsion. The particles have on the average a diameter of 5 microns or less. The aqueous emulsions comprise an aqueous continuous phase and dispersed therein particles having an average diameter of up to 5 microns, the particles being substantially a homogeneous blend of a cellulosic compound e.g., ester, and a polymer derived from at least one acrylic type monomer, the cellulosic compound being soluble in the monomer in the amount of at least 10 percent by weight. The aqueous emulsions are useful for protective and decorative coatings and as adhesives.

7 Claims, No Drawings

AQUEOUS EMULSIONS CONTAINING HOMOGENEOUS PARTICLES OF CELLULOSIC ESTER/ACRYLIC POLYMERS

BACKGROUND OF THE INVENTION

1. Field of the Invention

This invention relates to processes for preparing aqueous polymer emulsions and more particularly, to processes for preparing such emulsions from aqueous monomer-polymer dispersions. This invention also relates to aqueous polymer emulsions.

2. Description of the Prior Art

Aqueous polymer emulsions are generally produced by two methods. One method is the polymerization of monomers, e.g., polyvinyl acetate/acrylate copolymers from vinyl acetate and acrylic monomers. A second method is a post-dispersion technique, often by brute force, of bulk polymers in a liquid state, i.e., crystalline and semi-crystalline polymers in a fluid molten state, amorphous polymers in a liquid state, or polymers in organic solvent solution.

The first method is restricted to monomers which undergo free radical polymerization or copolymerization to form the desired polymer composition, structure, molecular weight, etc. Condensation polymers, cellulosics and many hydrocarbon resins are excluded from this method of forming an aqueous emulsion. Furthermore, end-use performance advantages afforded by polymer blends and readily gained in solvent-based systems are difficult and often impossible to duplicate with aqueous emulsion systems, since blends of such emulsions consist of heterogeneous particles. Addition of one or more monomers to a preformed latex "seed" of a different polymer composition either requires a lengthy diffusion time or affords a heterogeneous core/shell structure; in either case, increased particle size generally is inevitable.

The second method primarily is useful for oils, resins generally well above their glass transition temperatures under practical dispersion conditions, and for polymer solutions in organic solvents. Polymers with high glass transition temperatures, or with poor flow above this temperature, such as cellulose acetate butyrate, and polymers which decompose before significant flow, such as nitrocellulose, must be dissolved in an organic solvent prior to such aqueous dispersion. Polymer concentration in the organic solvent may be limited by viscosity, especially if polymer molecular weight is appreciable. Presence of solvent also seriously limits polymer concentration in the final emulsion, unless the solvent is carefully removed e.g., through evaporation. The latter step may be lengthy and costly.

SUMMARY OF THE INVENTION

It has now been found that aqueous polymer emulsions can be prepared by an improved process which comprises dispersing in an aqueous surfactant system a discontinuous phase consisting essentially of at least one polymer dissolved in substantially a monomer system to form an aqueous dispersion of polymer-monomer droplets, and polymerizing the aqueous dispersion by free radical polymerization whereby the monomer within the droplets becomes polymerized thereby forming a substantially homogeneous blend of at least two polymers within the particles of the emulsion.

The aqueous polymer emulsion comprises an aqueous continuous phase and dispersed therein particles having an average diameter of up to 5 microns, said particles being substantially a homogeneous blend of a cellulosic compound and a polymer derived from at least one monomer of the formula:

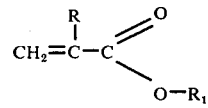

where R is hydrogen or methyl radical, and $R_1$ is an alkyl radical of 1 to 20 carbon atoms; cycloalkyl wherein the alkyl is 5 or 6 carbon atoms; $-CH_2CH_2OCH_2CH_3$; $-C_6H_5$ or $-CH_2C_6H_5$, said cellulosic compound being soluble in said monomer in the amount of at least about 10% by weight.

DETAILED DESCRIPTION OF THE INVENTION

The novel process for preparing aqueous homogeneous polymer emulsion as described herein comprises dispersing in an aqueous surfactant system a discontinuous phase consisting essentially of at least one polymer dissolved, e.g., in the amount of at least about 10 percent by weight, in substantially a monomer system thereby forming an aqueous dispersion of polymer-monomer droplets, and by free radical polymerization polymerizing the dispersion whereby the monomer within the droplets becomes polymerized and a substantially homogeneous blend of at least two polymers is formed within the particles of the emulsion.

The term "polymer emulsions" refers to emulsions having polymer particles of 0.01 to 5 microns in diameter on the average. The term "droplet" refers to a suspended spherical liquid particle.

The polymer can be dissolved in monomer followed by dispersion in the aqueous surfactant system, preferably utilizing a shear device. If the solution solids-viscosity relationship does not permit convenient presolution because of excessive viscosity, the polymer and monomer system may be dispersed directly into water containing the surfactant system with concurrent polymer-monomer dissolution by means of shear. Generally a shear device is preferred for producing minimum polymer-monomer particle size in a short time period; however, it has been found that in some instances simple paddle agitation is sufficient. Plasticizers and a coalescing cosolvent may optionally be incorporated into the dispersion step.

The polymerization of the monomer(s) in the dispersed droplets may be conducted either continuously or batchwise using conventional initiators that may be water soluble or oil soluble. It is preferred that the polymerization be conducted in a vessel separate from the vessel in which the dispersion was formed. More efficient control of the exothermic reaction can thus be achieved. The polymers formed are substantially non-grafted and non-crosslinked. While not desiring to be limited to any theory concerning the polymerization, since the droplets are preformed and they already contain polymer, conventional emulsion polymerization theories involving micelles, monomer reservoirs, etc. are not believed to apply. The polymerization of the monomer(s) may more nearly approximate conventional bulk polymerization within individual droplets.

The polymers useful herein are thermoplastic polymers having a molecular weight of about 5,000 to 1,000,000, preferably about 10,000 to 500,000 and possess the following characteristics: (1) Solubility in vinyl monomer or monomer mixture or monomer modified with appropriate cosolvent, plasticizer, where the monomer is the major weight fraction of the solvent; (2) Compatibility of prepolymer with polymer polymerized from monomeric solvent; (3) not grafted appreciably or crosslinked appreciably during emulsion polymerization; (4) molecular weight preferably greater than about 5,000 (weight average); however, many of the useful Picco resins manufactured by Hercules, Inc., for example, have a molecular weight of less than about 5,000, and (5) not a wax. Under (1) above the cosolvent/plasticizer should have preferably some function in the final emulsion product.

Useful polymers include cellulosics, e.g., nitrocellulose; cellulose acetate butyrate, cellulose acetate succinate, etc.; acrylic and methacrylic ester homopolymers and copolymers; polyvinyl acetate and vinyl acetate copolymers with acrylic esters, ethylene, and higher vinyl esters, e.g., "Veova 9-11", "Veova 10" vinyl mixed esters of versatic acid manufactured by Shell Chemical Company, New York; vinyl chloride/vinyl acetate copolymers; vinylidene chloride/acrylic ester copolymers; styrene and vinyl toluene homopolymers and acrylic ester copolymers; polyvinyl acetals, other than those having too low a degree of solubility in monomer, e.g., polyvinyl formal, polyvinyl acetal, polyvinyl butyral, etc.; polyvinyl caprylate, laurate, and palmitate; amorphous poly alkyl ethers (alkyl is methyl, ethyl, n-butyl, i-butyl); polyvinyl methyl ketone; poly-N-vinyl carbazole; poly-N-vinyl pyrrolidone copolymers (water insoluble types); polyindene and coumarone; phenol-formaldehyde resins of the Novolak type, uncured and low molecular weight 4-tert.-butyl phenol and 4-phenyl phenol polymers; some saturated polyesters, polyhexamethylene succinate and sebacate; polyhexamethylene carbonate. The following are low molecular weight synthetic thermoplastic Picco resins manufactured by Hercules, Inc., Wilmington, Delaware, which have the solubility/compatibility required; most are of very low molecular weight of less than about 5,000: terpene phenolic and terpene-phenolformaldehyde resins; thermoplastic aliphatic hydrocarbon resins derived from high temperature cracking of petroleum (Piccopale), molecular weight 800–1500 (also Picco Series 6000); copolymers of α-methyl styrene and vinyl toluene (low molecular weight, Piccotex); low molecular weight polystyrene (300–6,000, Piccolastic); alkyl-aromatic hydrocarbon resins (Piccovar); styrene/acrylonitrile/indene terpolymers (Piccoflex), low molecular weight. Low molecular weight thermoplastic hydrocarbon resins have also proved to be useful. Included in this type of resins are: hydrocarbon resins, coumarone-indene resins, petroleum resins, styrene polymers, vinyl aromatic polymers, cyclopentadiene resins, terpene resins, and phenolic resins. These resins are defined hereinafter.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology", Second Edition, 1966, Interscience Publishers, New York, Volume 11, Pages 242 to 255.

The term "coumarone-indene resins" refers to hydrocarbon resins obtained by polymerization of the resin formers recovered from coke-oven gas and in the distillation of coal tar and derivatives thereof such as phenol-modified coumarone-indene resins. These resins are fully described in the Kirk-Othmer Encyclopedia, supra, Volume 11, Pages 243 to 247.

The term "petroleum resins" refers to hydrocarbon resins obtained by the catalytic polymerization of deeply cracked petroleum stocks. These petroleum stocks generally contain mixtures of resin formers such as styrene, methyl styrene, vinyl toluene, indene, methyl indene, butadiene, isoprene, piperylene and pentylenes. These resins are fully described in the Kirk-Othmer Encyclopedia, supra, Volume 11, Pages 248 to 250. The so-called "polyalkyl-aromatic resins" fall into this classification.

The term "styrene polymers" refers to low molecular weight homopolymers of styrene as well as copolymers containing styrene and other comonomers such as alpha-methyl-styrene, vinyl toluene, butadiene, and the like when prepared from substantially pure monomer.

The term "vinyl aromatic polymers" refers to low molecular weight homopolymers of vinyl aromatic monomers such as styrene, vinyl toluene, and alphamethyl styrene, copolymers of two or more of these monomers with each other, and copolymers containing one or more of these monomers in combination with other monomers such as butadiene, and the like. These polymers are distinguished from petroleum resins in that they are prepared from substantially pure monomer.

The term "cyclopentadiene resins" refers to cyclopentadiene homopolymers and copolymers derived from coal tar fractions or from cracked petroleum streams. These resins are produced by holding a cyclopentadiene-containing stock at elevated temperature for an extended period of time. The temperatures at which it is held determines whether the dimer, trimer, or higher polymer is obtained. These resins are fully described in the Kirk-Othmer Encyclopedia, supra, Volume 11, Pages 250 and 251.

The term "terpene resins" refers to polymers of terpenes which are hydrocarbons of the general formula $C_{10}H_{16}$ occurring in most essential oils and oleoresins of plants, and phenol-modified terpene resins. Suitable terpenes include alpha-pinene, beta-pinene, dipentene, limonene, myrcene, bornylene, camphene, and the like. These products occur as by-products of coking operations of petroleum refining and of paper manufacture. These resins are fully described in the Kirk-Othmer Encyclopedia, supra, Volume 11, Pages 252 to 254.

The term "phenolic resins" refers to the products resulting from the reaction of phenols with aldehydes. In addition to phenol itself, cresols, xylenols, p-tert.-butylphenol, p-phenylphenol and the like may be used as the phenol component. Formaldehyde is the most common aldehyde, but acetaldehyde, furfuraldehyde and the like may also be used. These resins are fully described in the Kirk-Othmer Encyclopedia, supra, Volume 15, Pages 176 to 207.

The polymers may be produced by many procedures known to those skilled in the art, such as free radical polymerization; condensation polymerization; cationic (e.g., Friedel-Crafts) polymerization; anionic polymerization; esterification, e.g., nitration; substitution, e.g., chlorination; postreaction, e.g., polyvinyl butyral; etc.

The monomer systems which act as solvents for the aforementioned polymers can contain monomers represented by the general formula

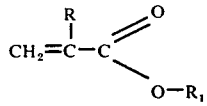

where R is hydrogen or $CH_3$, and $R_1$ is an alkyl radical of 1 to 20 carbon atoms; cycloalkyl wherein alkyl is 5 or 6 carbon atoms; $—CH_2CH_2OCH_2CH_3$; $—C_6H_5$ or $—CH_2C_6H_5$.

Other useful monomers in the system include: (1) styrene and substituted sytrenes of the general formula:

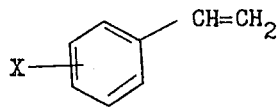

where X is hydrogen; $CH_3$; halogen, e.g., Cl, Br; $NO_2$; $NH_2$; $N(alkyl)_2$, where akyl is 1 or 2 carbon atoms, alone or in conjunction with acrylic comonomers. Preferably X is hydrogen or $CH_3$. (2) Vinyl acetate and higher vinyl esters, propionate and butyrate, and the mixed esters of versatic acid known as "Veova 9-11" and "Veova 10". Preferred are vinyl acetate and vinyl acetate/acrylate comonomers. (3) Vinyl chloride and vinylidene chloride in conjunction with acrylate comonomers. (The use of vinyl chloride requires pressure equipment.)

The monomer system may also contain a minor proportion, e.g., up to about 30 percent by weight, based on the weight of total monomer, of at least one of the following monomers represented by the general formula:

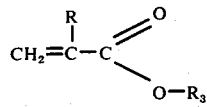

where R is as defined above and $R_3$ is hydrogen, 2-sulfoethyl or hydroxyalkyl where alkyl is of 1 to 4 carbon atoms; or of the general formula:

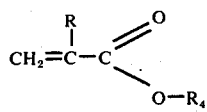

where R is as defined above and $R_4$ is $NH_2$, $NHCH_2OH$ or $NHCH_2O$ alkyl where alkyl is of 1 to 4 carbon atoms. There also can be present as a minor monomer component up to about 20 percent by weight, based on the weight of total monomer of acrylonitrile or methacrylontrile. Mixtures of these additional monomers are possible in an amount not exceeding 30 percent by weight, based on the weight of total monomer. If a water-soluble monomer(s) is present, it is generally present in less than about 20 percent by weight, preferably less than 10percent by weight of the monomer system.

It is often desirable to add to the monomer system an inhibitor to prevent premature polymerization of the monomer during the dispersing step. Typical inhibitors include: hydroquinone, hydroquinone monomethyl ether(p-methoxyphenol), t-butyl catechol, 2,4-di-tert. butyl-6-methyl phenol, etc. The inhibitor is generally present in an amount of 0.001 to 0.1 percent by weight based on the weight of monomer.

It is essential that the polymer have some solubility, e.g., at least about 10 percent by weight, in the monomer system modified with plasticizers and/or non-monomeric cosolvents. The number of polymers, monomers and optional modifiers used at one time is limited only by practicality. The concentration of polymer to monomer is at least 10 to 90 polymer concentration. The practical concentration of polymer is dependent on the polymer molecular weight, polymer/solvent interactions, and corresponding solids/viscosity/temperature relationship, e.g., a very low molecular weight, e.g., 5,000 weight average, soft resin at high temperature in a very high shear device can be utilized at a polymer/monomer ratio several orders of magnitude greater than a very high molecular weight, e.g., one million weight average, hard resin at lower temperatures. Generally, the polymer is present in 10 to 80 parts by weight, and the monomer is present in 90 to 20 parts by weight. Preferred ranges are 20 to 60 parts by weight polymer and 80 to 40 parts by weight monomer.

Aqueous surfactant systems useful in the process of this invention are summarized and described in "Emulsions: Theory and Practice", by Paul Becker, Chapter 6, Reihnold Publishing Corp., New York, 1965; and in Mc Cutcheon's "Detergents and Emulsifiers, 1972 Annual". The surfactants include anionic agents such as: carboxylates, e.g., fatty acid soaps (from lauric, stearic, oleic acids), and acyl derivatives of sarcosine (methyl glycine); sulfates, e.g., sodium lauryl sulfate (Duponol C), sulfated natural oils and esters (Turkey-red oil), and alkyl aryl polyether sulfates (Triton X-301); sulfonates, e.g., alkyl aryl polyether sulfonates (Triton X-200, Ultrawet DS, K, 35K, 42K), isopropyl naphthalene sulfonates (Aerosol OS), and sulfosuccinates and sulfosuccinamates (Aerosol OT, MA, TR, 102, 18); phosphate esters, e.g., short chain fatty alcohol partial esters of complex phosphates (Victawet), and orthophosphate esters of polyethoxylated fatty alcohols (Gafac).

The above anionic agents may be in the sodium, potassium, lithium, ammonium or amine salt form, most commonly sodium or ammonium.

Cationic agents include: N(lauryl colamine formyl methyl) pyridimium chloride [Emcol E-607], lauryl dimethylbenzyl ammonium chloride (Vantoc CL), and other amine salts and of quaternary ammonium compounds.

Amphoteric agents include: lauryl ammonium sulfonic acid betaine (Sulfobetaine DLH). Nonionic agents include ethoxylated (i.e., ethylene oxide derivatives of) mono- and polyhydric alcohols (e.g., the Triton octyl- and nonyl-phenol series), ethylene oxide/-propylene oxide block copolymers (Pluronic series), esters (e.g., glyceryl mono-stearate), products of the dehydration of sorbitol (Span and Tween series, e.g., sorbitan monostearate, polyethylene oxide sorbitan monolaurate), and amides (e.g., Lauridit LP lauric acid isopropanol amide).

Most commonly used would be anionic, nonionic and anionic/nonionic combinations.

Also useful, either alone or in combination with surfactants described above, are colloids and high molecular weight stabilizers, such as complex polysaccharides (gum acacia and gum tragacanth), amylopectin, water-soluble derivatives of cellulose (e.g., sodium carboxymethyl cellulose, hydroxyethyl and hydroxypropyl celluloses), polyvinyl alcohol (e.g., partially hydrolyzed grades), alginates and carageenin.

Selection of appropriate surfactants and stabilizers is discussed in numerous books and articles, including the above reference. It is often a matter of trial-and-error. Typical levels employed range from about 0.1–10.0 percent, more often 1–9 percent, based on total final polymer weight.

Useful cosolvents and plasticizers which may be used include: glycols, e.g., ethylene, propylene glycol, butanediol, 2-methylpentane-2,4-diol, etc.; glycol ethers, e.g., methoxyethylene glycol, ethoxyethylene glycol, n-butoxyethylene glycol, diethylene glycol methyl ether, diethylene glycol ethyl ether, diethylene glycol n-butyl ether, etc.; glycol ether acetates, e.g., methoxyethylene glycol acetate, ethoxyethylene glycol acetate, n-butoxy ethylene glycol acetate, diethylene glycol ethyl ether acetate, diethylene glycol n-butyl ether acetate, etc.

Plasticizers: aliphatic mono- and dibasic fatty acids, e.g., triacetin, triethylene glycol di(2-ethylbutyrate), triethylene glycol di(2-ethylhexoate), polyethylene glycol di(2-ethylhexoate), di(2-ethylhexyl) adipate, etc.; aliphatic acids with both carboxyl and hydroxyl functions, e.g., butyl acetyl ricinoleate, di-isobutyl tartrate, acetyl tri-n-butyl citrate, etc.; based on aromatic acid, e.g., dimethyl phthalate, diethyl phthalate, dibutyl phthalate, di(2-ethylhexyl) phthalate, dibutoxyethyl phthalate, diphenyl phthalate, dipropylene glycol dibenzoate, etc.; derivatives of phthalyl glycollic acid, e.g., methyl phthalyl methyl glycollate, ethyl phthalyl ethyl glycollate, butyl phthalyl butyl glycollate, etc.; phosphate esters, e.g., tributyl phosphate, tributoxyethyl phosphate, tri-(2-ethylhexyl) phosphate, tritolyl phosphate, triphenyl phosphate, 2-ethylhexyl diphenyl phosphate, etc.; sulphonamides, e.g., p-toluene sulphonamide, mixed o- and p-toluene sulphonamides, N-ethyl p-toluene sulphonamide, N-cyclohexyl p-toluene sulphonamide, etc.; chlorinated diphenyls and other chlorinated hydrocarbons, e.g., chlorinated biphenyls having a chlorine content of 21, 42 and 68% by weight and specific gravity at 25°C. of 1.182–1.192, 1.381–1.392 and 1.804–1.811, respectively, chlorinated triphenyls having 42 weight percent chlorine and specific gravity at 25°C. of 1.470, etc.; polyesters poly-1:3 butylene adipate, polypropylene adipate, etc. Other plasticizers are disclosed in H. Warson, "The Application of Synthetic Resin Emulsions", Ernest Benn Ltd., London, Table III.5, 1972.

Procedures for forming the aqueous dispersion are described in chapter 7 of the above-identified Becker textbook. Among the procedures are: presolution of the polymer in the monomer, concurrent solution of the polymer in the monomer using simple pot and paddle agitation, orifice mixing, ultrasonic mixing, mixing with turbine stirrers, homogenizers, colloid mills, Kady Mills manufactured by Kinetic Dispersion Corporation, Buffalo, New York, as well as other shear devices; and combinations of the above.

The temperature and pressure used during the dispersion are determined by the vapor pressure relationship for the particular solvent system used. For example, ethylene which boils at −103.8°C./760 mm, requires a pressurized system. The time for dispersion can vary from a few minutes to several hours, 5 to 60 minutes being preferred. The temperature can range from below ambient to 150°C., ambient to 100 °C. being preferred.

After the dispersion is prepared polymerization is conducted by free radical initiation to produce the aqueous emulsion, a substantially homogeneous blend of at least two polymers within the dispersed particles. The polymerization is preferably carried out in a vessel separate from the one in which the dispersion was prepared. In this manner more efficient control of the exotherm is obtained. Depending on the constituents present the polymerization processes can be conducted under atmospheric or pressurized conditions. The reactor can be either continuous or batch. A cascade system of polymerization is also useful. The polymerization reaction requires the presence of a free radical initiator which can be added either in bulk form or can be continuously fed in water or appropriate organic solvent during a continuous polymerization reaction. The polymerization temperature ranges from 0°C. to greater than 200°C., preferably ambient temperature to about 140°C., and more preferably ambient to 100°C. The reaction can be conducted in a matter of minutes to several hours, generally about 30 minutes to about 6 hours.

Useful free radical initiators include water soluble or oil soluble types. Useful water soluble compounds include: sodium, potassium and ammonium persulfates; hydrogen peroxide; with or without reducing agent (e.g., iron salts; sodium sulfite, thiosulfate, metabisulfite; zinc or sodium formaldehyde sulfoxylate). Useful oil soluble compounds include: azo compounds, e.g., azobisisobutyronitrile, azobis(di-methylvalero) nitrile; peroxides and hydroperoxides, e.g., benzoyl peroxide, lauroyl peroxide, di-t-butyl hydroperoxide; with or without amine accelerators (e.g., p-toluidine) or reducing agents of the type described under water soluble initiators. Typically the intiator is present in 0.01 to 2.0% by weight, preferably 0.1 to 1.0% by weight, based on the weight of polymerizable monomer. Chain transfer agents, auxiliary surfactants and protective colloids known to those skilled in the art can be present during the polymerization reaction.

The aqueous polymer emulsions range in viscosity from 5 centipoises to greater than 10,000 centipoises. The amount of solids in the emulsion is from 20 to up to 75 percent, usually 20 to 65 percent, by weight solids. The average sizes of particles in the emulsion range from 0.01 to 5.0 microns, preferably 0.02 to 1.5 microns, and more preferably 0.1 to 1.0 micron.

The above-described process provides a convenient and economical route to achieve aqueous polymer emulsions having a high solids content in which each particle of the emulsion is substantially a homogeneous blend of two or more polymers. The polymer emulsions either cannot be produced by conventional methods or are produced by more complex and expensive known methods, or the emulsions produced by the known methods either contain heterogeneities within the individual particles or the particles are of excessive size, i.e., above 5 microns in diameter. By the inventive procedure, the solvent present does not dilute the ultimate emulsion polymer concentration and is not removed. Through the free radical polymerization the monomeric solvent becomes an integral part of the polymer system. The overall process is less polluting and less flammable, requiring less organic solvent as compared to prior art methods.

The aqueous polymer emulsions are useful as protective and decorative coatings and adhesives for metal, plastic and cellulosic substrates. More particularly, the nitrocellulose/acrylic polymer emulsions form clear thermoplastic coatings for wood substrates, e.g., furniture and cabinet finishes, and flexible substrates such as films and fabrics.

EXAMPLES OF THE INVENTION

The following examples wherein the percentages are by weight illustrate the invention. The Brookfield viscosity values of the emulsion were measured with a Brookfield Synchro-lectric Viscometer, Model LVF, at 60 rpm. This viscometer is described in P. Becher, "Emulsions: Theory and Practice", Page 408, Reinhold Publishing Corp. New York, 1965.

The inherent viscosity values of the emulsion were determined as follows: About 0.5 gram emulsion was weighed to the third place and dissolved in tetrahydrofuran (50 ml). The inherent viscosity was determined using a No. 100 Cannon-Fenske Viscometer as described in F. Billmeyer, Jr., "Textbook of Polymer Science", pp. 79–84, Interscience, New York, 1962, where inherent viscosity is defined as the natural logarithm (relative viscosity) divided by polymer concentration, and where relative viscosity is the ratio of solution to solvent efflux times:

$$\text{Inherent Viscosity} = \frac{\text{Ln (Rel. Visc.)}}{\text{Conc.}}$$

$$\text{Relative Viscosity} = \frac{\text{Solution time}}{\text{Solvent time}}$$

Polymer concentration was adjusted for emulsion percent solids as determind by gravimetric removal of volatiles (100°C., vacuum oven, 4 hours).

The Sward Rocker Hardness was measured relative to plate glass (equal to 100) with a Sward Rocker manufactured by Gardner Laboratory, Inc., Bethesda, Md., as described in Official Digest, Nov., 1954, pages 1030–1037.

Profile particle size was judged visually with a Bausch & Lomb Model PB-525 inclined photobinocular microscope at 830X magnification equipped with a Whipple Disc (smallest subdivision equivalent to 1.5 microns).

EXAMPLE 1

A one-quart stainless steel container equipped with jacketed cooling was charged with 112 g. Elvacite 2009, a medium molecular weight methyl methacrylate bead polymer manufactured by E. I. du Pont de Nemours and Company, Inc., Wilmington, Delaware, dissolved in 131 g. methyl methacrylate and 131 g. ethyl acrylate monomers; three quarters of an aqueous surfactant solution consisting of 84 g. 25% Gafac RE-610, complex phoshate esters, manufactured by General Aniline and Film Corp., New York, New York, neutralized to pH 7.0 with sodium hydroxide, 10 g. Triton X100, octylphenoxy polyethoxy ethanol, manufactured by Rohm and Haas, Philadelphia, Pa., 0.75 g. Hercules Defoamer 340F, manufactured by Hercules, Inc., Wilmington, Delaware, and 390 ml. distilled water. The charge was milled on a Kady Model L laboratory Mill, Kinetic Dispersion Corporation, Buffalo, New York, for 11 minutes, allowing the contents to reach 38°C. The dispersion formed was transferred to a 2-liter resin kettle fitted with a nitrogen inlet, mechanical agitation, addition funnel, thermometer and reflux condenser; heating and cooling being provided via a glycerine bath. The balance of the aqueous solution as added, the contents were heated to 69°C. under nitrogen, and a solution of 0.3 g. potassium persulfate in 35 ml. distilled water was added dropwise at a rate of ½ ml./minute. The contents temperature rose to 80.5°C. at 35 minutes, then gradually dropped to 68°C. at 70 minutes. The temperature was raised to 88°C., 0.2 g. potassium persulfate in 10 ml. water was added all at once, and temperature was maintained at 87° to 88°C. for 20 minutes. The emulsion was cooled and poured through a screen, negligible coagulum being detected. The 44% solids emulsion formed clear films when 50 g. of emulsion was blended with 10 g. of a coalescent: butyl Cellosolve acetate (n-butoxy ethylene glycol acetate) manufactured by Union Carbide.

EXAMPLE 2

A one-quart stainless steel jacketed vessel was charged with 187 g. water-wet nitrocellulose LC-17, 29.5% water, "¼ second", 10.9 to 11.2% nitrocellulose nitrogen content, an aqueous surfactant phase consisting of 41.7 g. 25% Gafac RE-610, 24.8 g. Ultrawet 42K, a linear aralkyl sulfonate, 42% solids concentration manufactured by ARCO, Philadelphia, Pennsylvania, 4.0 g. sodium bicarbonate, 1 ml. Hercules Defoamer 340F and 283 ml. distilled water. A monomer phase consisting of 4.2 g. methacrylic acid, 201.5 g. methyl methacrylate, 86.3 g. 2-ethyl hexyl acrylate, and 0.08 g. hydroquinone monomethyl ether was added, and the mixture was mixed on a Kady Model L Mill for 45 minutes. During this time, 53 ml. distilled water, 8.3 g. 25% Gafac RE-610 (pH 7.0) and 5.0 g. Ultrawet 42K was additionally added. Microscopic examination of several drops of dispersion diluted in several ounces water indicated no particles greater than 1 micron. The dispersion was transferred to a 2-liter agitated polymerization vessel, 0.27 g. n-dodecyl mercaptan was added, and the contents were heated to 65.5°C. Potassium persulfate, 0.42 g. in 40 ml. distilled water, was added dropwise at a rate of 1 ml./minute for 10 minutes, ½ ml./minute for 10 minutes, and ¼ ml./minute for 40 minutes, as reaction temperature gradually rose to 74-½°C., then dropped to 69°C. At this point, the balance of the in initiator solution was added, 0.1 g. sodium sulfite in 5 ml. distilled water was added, temperature was increased to 71° to 74°C. and maintained for 35 minutes. A 46% solids emulsion, pH 6.7, Brookfield viscosity (60 rpm, 25°C.) 13 centipoises, with negligible coagulum was obtained. Inherent viscosity (0.4% polymer in wet tetrahydrofuran, measured at 25°C. using a No. 100 Cannon-Fenske Viscometer) of the solids was 0.48. Incorporatiom of 12 g. butyl Cellosolve acetate into 50 g. emulsion provided clear, smooth films with a Sward Rocker Hardness value of 38 versus plate glass at 100.

EXAMPLE 3

A one-quart jacketed Kady Mill vessel was charged with an aqueous surfactant phase consisting of: 57.6 g. 25% aqueous Gafac RE-610 at pH 7.0, 27.4 g. Ultrawet 35K, a linear aralkyl sulfonate, 35% solids concentration 3.8 g. sodium bicarbonate, 180 ml. distilled water; and a monomer phase of 4.0 g. methacrylic acid, 148.0 g. methyl methacrylate, 148.0 g. ethyl acrylate, and 0.08 g. hydroquinone monomethyl ether. Half-second cellulose acetate butyrate (100.0 g.) was added and the mixture was milled for 30 minutes. Microscopic examination of the resulting dispersion revealed particles generally of submicron particle size. The dispersion was transferred to an agitated polymerization vessel; 0.25 g. n-dodecyl mercaptan and 5 drops 0.15% ferric ammonium sulfate were added; and the dispersion was polymerized under nitrogen at 71° to 76°C. by dropwise addition of potassium persulfate, 0.60 g. plus 4.0 g. Triton X-100 surfactant/45 ml. water, for 118 minutes (29 ml. added) followed by addition of the initiator balance plus 0.15 g. sodium sulfite and maintenance of 75° to 76°C. temperature for 45 minutes. The resulting emulsion was 59.0% solids and had a Brookfield viscosity of 3520 cps. (No. 4 spindle at 60 rpm). Inherent viscosity in tetrahydrofuran (0.54 g. emulsion per 50 ml.) was 0.64.

EXAMPLE 4

A one-quart Kady Mill vessel was charged with 80.6 g. 25% aqueous Gafac RE-610 at pH 7.0, 22.4 g. Ultrawet 35K, 3.8 g. sodium bicarbonate and 166 ml. distilled water, followed by 4.0 g. methacrylic acid, 236.8 g. methyl methacrylate, 59.2 g. butyl acrylate and 0.08 g. hydroquinone monomethyl ether, and subsequently by 100 g. Bakelite VYNS vinyl chloride-vinyl acetate copolymer manufactured by Union Carbide Corp., New York, New York. The mixture was milled for 30 minutes, then transferred to a polymerization vessel. To the agitating dispersion were added 5 drops 0.15% ferric ammonium sulfate and 0.25 g. n-dodecyl mercaptan. Under nitrogen at 70°C., potassium persulfate, 0.60 g./45 ml. water plus 4.0 g. Triton X-100 surfactant, were added dropwise for 80 minutes. The temperature gradually rose to 96°C. at 60 minutes, then dropped to 70°C. by 80 minutes. The balance of the persulfate (22.5 ml.) was added together with 0.15 g. sodium sulfate. The temperature was maintained at 71° to 73°C. for 45 additional minutes. The 58.6% solids emulsion had a Brookfield viscosity of 736 centipoises (No. 3 spindle at 60 rpm) and an inherent viscosity of 0.60 (tetrahydrofuran).

EXAMPLE 5

A mixture of 44.8 g. 25% Gafac RE-610 at pH 7.0, 48.0 g. Ultrawet 35K, 3.8 g. sodium bicarbonate, 170 ml. distilled water, 4.0 g. methyl methacrylate, 118.4 g. 2-ethylhexyl acrylate, 0.08 g. hydroquinone monomethyl ether, and 100 g. Parlon S-10 chlorinated rubber manufactured by Hercules, Inc., Wilmington, Delaware, was milled in a one-quart Kady Mill for 30 minutes. Average particle size was about one micron. The dispersion was transferred to a polymerization vessel, and 5 drops 0.15% ferric ammonium sulfate and 0.25 g. n-dodecyl mercaptan were added. Under nitrogen at 70° to 72.5°C. potassium persulfate, 0.60 g. in 45 ml. water plus 4.0 g. Triton X-100 surfactant, were added dropwise for 120 minutes (35 ml.). The balance of the initiator, 0.09 g. additional potassium persulfate, 0.15 g. sodium sulfite were added, and the temperature was maintained at 72° to 74°C. for 45 minutes. The resulting 59.4% solids emulsion had a Brookfield viscosity of 300 centipoises (No. 3 spindle at 60 rpm) and an inherent viscosity of 0.48 (tetrahydrofuran).

EXAMPLE 6

A one-quart Kady Mill pot was charged with the following aqueous phase: 44.8 g. 25% Gafac RE-610 at pH 7.0, 48.0 g. Ultrawet 35K, 3.8 g. sodium bicarbonate and 160 ml. distilled water. The following solution then was added: 4.0 g. methacrylic acid, 83.4 g. Piccolastic A-50 low molecular weight styrene resin manufactured by Hercules, Inc., Wilmington, Delaware, 197.3 g. butyl acrylate, 131.5 g. styrene and 0.08 g. hydroquinone monomethyl ether. The mixture was milled for 30 minutes and transferred to a polymerization vessel. Microscopic examination showed essentially submicron particle size. With agitation, 4.0 g. Triton X-100 surfactant, 5 drops 0.15% ferric ammonium sulfate, and 0.30 g. sodium sulfite were added. Under nitrogen at 73.5° to 76.5°C. potassium persulfate, 0.60 g. in 45 ml. water, was added dropwise (31.25 ml.) for 125 minutes. The balance of the persulfate plus 0.15 g. sodium sulfite was added. The temperature was maintained at 72° to 74.5°C. for 45 minutes. The resulting emulsion was very viscous (Brookfield viscosity of >10,000 centipoises, No. 4 spindle at 60 rpm), had a bluish tint, contained 55.9% solids and had an inherent viscosity of 0.43 (tetrahydrofuran).

EXAMPLE 7

A one-gallon Kady Mill vessel was charged with 1875 g. of a 75:25 solution of vinyl acetate monomer: ethylene/vinyl acetate copolymer resin having a vinyl acetate content of 40% by weight and with an aqueous phase consisting of 32.6 g. Gohsenol GM-14, 75.7 g. Gohsenol GL-05, partially hydrolyzed polyvinyl alcohols manufactured by Nippon Gohsei, Japan, 22 g. Triton X-100 nonionic surfactant, 2 g. Hercules Defoamer 340F and 1927 ml. distilled water. The mixture was milled for 10 minutes, allowing the temperature to rise to 50°C. This process was repeated four times to provide about four gallons of dispersion. A jacketed stainless steel autoclave was charged with 7669 g. of dispersion and pressurized to 1000 psig with ethylene. At 50° to 55°C. and 1500 psig, polymerization was effected with a hydrogen peroxide-zinc formaldehyde sulfoxylate redox system to provide a stable 43.5% solids emulsion containing 23.5% ethylene content polymer.

EXAMPLE 8

A one-quart stainless steel container equipped with jacketed cooling was charged with Solution A: 161.0 g. methyl methacrylate, 161.0 g. 2-ethylhexyl acrylate, 4.7 g. methacrylic acid, 194.0 g. nitrocellulose, 30% isopropanol, 30–35 cps., 11.8 to 12.2% nitrocellulose nitrogen content, 4.8 g. Triton X-45, octylphenoxy polyethoxy ethanol, 11.7 g. Tween 60 polyethoxy sorbitan monostearate surfactants, and 0.09 g. p-methoxy phenol inhibitor; Solution B: 10.7 g. Ultrawet DS, a linear aralkyl sulfonate, 100% solids, 22.8 g. Gafac RE-610, 25% aqueous solution at pH 7.0. 0.75 g. Hercules 340 F Defoamer and 199 ml. distilled water. The mixture was milled on a Kady Model L mill for 15 minutes, the temperature finally reaching 48°C. The resulting dispersion was diluted with 100 ml. water, and then neutralized from pH 5.9 to 7.0 with NaHCO₃. Microscopic examination showed all submicron particle size. The dispersion plus 165 ml. water was heated in a 2-liter polymerization vessel to 70°C. and 0.50 g. potassium persulfate in 35 ml. water was added at 0.5 ml./minute for 45 minutes. The balance of the initiator solution was added and temperature was held at 74° to 81°C. for 30 minutes. The resulting 46% solids emulsion contained only a trace of coagulant.

EXAMPLE 9

To a one-quart stainless steel jacketed vessel was added 350.0 g. nitrocellulose 44.9% water, 18 to 25 centipoises, 11.8 to 12.2% nitrocellulose nitrogen content, Solution A: 35.0 g. 25% aqueous Gafac RE-610 at pH 7.0, 48.7 g. Ultrawet 42K, 4.0 g. NaHCO₃, 170 ml. water, and solution B: 142.6 g. methyl methacrylate, 95.1 g. 2-ethylhexyl acrylate, 4.2 g. methacrylic acid and 0.08 g. p-methoxy phenol. This was milled with a Kady Model L unit for 45 minutes, during which time 30 ml. water was added to assist in mixing. The resulting submicron particle size dispersion was transferred to a 2-liter polymerization unit and polymerized in 2 hours at 67° to 84°C. with a 0.36 g. potassium persulfate in 50 ml. water feed and with 0.15 g. Na₂SO₃ in 5 ml. water added at 75 minutes. The 47.8% solids emulsion had negligible coagulum, a pH of 6.0, Brookfield viscosity of 18 cps. (60 rpm) and an inherent viscosity of 0.63 (wet tetrahydrofuran). Nitrocellulose was 44.4% of the polymeric phase. Clear flexible coatings were achieved from the following formulaton: 50 g. of above emulsion, 8.2 ml. water and 1.9 g. butyl Cellosolve acetate containing 4.2 g. tricresyl phosphate plasticizer.

EXAMPLE 10

A one-gallon stainless steel jacketed Kady Mill Model L vessel was charged with 444.2 g. nitrocellulose 32.5% water, "¼ second", 11.8 to 12.2% nitrocellulose nitrogen content, Solution A: 104.6 g. 25% aqueous Gafac RE-610 at pH 7.0 (sodium salt), 92.0 g. Ultrawet 35K, 8.0 g. NaHCO₃, 439 ml. water, and Solution B: 277.6 g. methyl methacrylate, 256.2 g. 2-ethylhexyl acrylate, 8.4 g. methacrylic acid, 108.4 g. butyl Cellosolve acetate, 45.2 g. Santicizer 160, butyl benzyl phthalate, manufactured by Monsanto Co., St. Louis, Mo., and 0.16 g. p-methoxy phenol. Practically all particles were below one micron after 45 minutes of milling. A 2-liter polymerization vessel was charged with 800 g. of this dispersion, 0.25 g. 0.15% ferric ammonium sulfate solution, 0.25 g. n-dodecyl mercaptan, 2.5 g. Triton X-100, and 0.98 g. Alcolac COPS II acrylic sulfate copolymerizable surfactant, 85% active, manufactured by Alcolac Corp., Baltimore, Md. Potassium persulfate, 0.30 g. in 6 ml. water, was added over a 105-minute period at 69° to 71°C. polymerization temperature. Then, 0.30 g. potassium persulfate in 6 ml. water and 0.15 g. Na₂SO₃ in 3 mil water was added, and temperature was held at 73½° to 80°C. for 45 minutes. The resulting emulsion had negligible coagulum and was 48.6% solids. To 50 g. of this emulsion was added 4.0 g. butyl Cellosolve acetate, a 6 mil (wet) drawdown was made on a glass plate, and the coating was allowed to air dry 68 hours to provide a Sward Rocker Hardness value of 40 versus plate glass at 100. Formulations consisting of emulsion, butyl Cellosolve acetate, and additional Santicizer 160 plasticizer were thickened to 180 centipoises (Brookfield viscosity at 60 rpm) and were applied to wood substrates with a conventional suction-type spray gun to provide clear coatings.

EXAMPLE 11

A one-quart stainless steel container equipped with jacketed cooling was charged with 186.7 g. nitrocellulose, described in Example 10, Solution A: 42.6 g. 25% aqueous Gafac RE-610 at pH 7.0 (sodium salt), 32.6 g. Ultrawet 35K, 3.0 g. NaHCO₃, 142.7 ml. water, and Solution B: 106.9 g. n-butyl methacrylate, 78.9 g. ethyl acrylate, 31.5 g. Santicizer 160, butyl benzyl phthalate, 73.4 g. butyl Cellosolve acetate, 3.2 g. methacrylic acid, and 0.06 g. p-methoxy phenol. Essentially all particles were below one micron after 30 minutes milling on a Kady Model L laboratory mill. The dispersion was transferred to a 2-liter polymerization vessel, and 0.25 g. 0.15% aqueous ferric ammonium sulfate, 1.7 g. Triton X-100, 1.5 g. Triton X-114 surfactant and 0.17 g. n-dodecyl mercaptan were added. Potassium persulfate, 0.60 g. in 60 ml. water, was added at ½ ml./minute for 10 minutes at ¼ ml./minute for 100 minutes as the reaction temperature was maintained at 69.5° to 71°C. The balance of the initiator solution and 0.15 g. Na₂SO₃ in 5 ml. water were added, the temperature was increased to the 75°–80.5°C. range and was held for 40 minutes. The resulting emulsion had negligible coagulum and was 47.1% solids.

We claim:

1. An aqueous polymer emulsion comprising an aqueous continuous phase and dispersed therein particles having an average diameter of up to 5 microns, said particles being substantially a homogeneous blend of a water insoluble cellulosic ester and a polymer derived from at least one monomer of the formula:

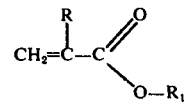

where R is hydrogen or methyl radical, and $R_1$ is an alkyl radical of 1 to 20 carbon atoms; cycloalkyl wherein the alkyl is 5 or 6 carbon atoms; —CH₂CH₂OCH₂CH₃; —C₆H₅ or —CH₂C₆H₅, said cellulosic ester being soluble in said monomer in the amount of at least about 10 percent by weight.

2. An emulsion according to claim 1 wherein the monomer is methyl methacrylate.

3. An emulsion according to claim 1 wherein the monomer is 2-ethyl hexyl acrylate.

4. An emulsion according to claim 1 wherein the monomer is n-butyl methacrylate.

5. An emulsion according to claim 1 wherein the cellulosic ester is nitrocellulose.

6. An emulsion according to claim 1 wherein the monomers are methyl methacrylate, 2-ethyl hexyl acrylate and methacrylic acid and the cellulosic ester is nitrocellulose.

7. An aqueous polymer emulsion comprising an aqueous continuous phase and dispersed therein particles having an average diameter of up to 1.5 microns, said particles being substantially a homogeneous blend of a water insoluble cellulosic ester and a polymer derived from at least one monomer of the formula:

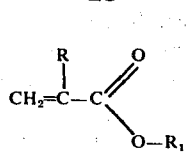
where R is hydrogen or methyl radical, and $R_1$ is an alkyl radical of 1 to 20 carbon atoms; cycloalkyl werein the alkyl is 5 or 6 carbon atoms; $-CH_2CH_2OCH_2CH_3$; $-C_6H_5$ or $-CH_2C_6H_5$, said cellulosic ester being soluble in said monomer in the amount of at least about 10 percent by weight.
* * * * *